(12) United States Patent
Müller et al.

(10) Patent No.: US 11,595,741 B2
(45) Date of Patent: Feb. 28, 2023

(54) CAMERA AND METHOD FOR DETECTING IMAGE DATA

(71) Applicant: SICK AG, Waldkirch (DE)

(72) Inventors: Romain Müller, Waldkirch (DE);
Tobias Pontiggia, Waldkirch (DE)

(73) Assignee: SICK AG, Waldkirch (DE)

( * ) Notice: Subject to any disclaimer, the term of this patent is extended or adjusted under 35 U.S.C. 154(b) by 98 days.

(21) Appl. No.: 17/225,526

(22) Filed: Apr. 8, 2021

(65) Prior Publication Data

US 2021/0321041 A1 Oct. 14, 2021

(30) Foreign Application Priority Data

Apr. 9, 2020 (DE) ..................... 10 2020 109 928.2

(51) Int. Cl.
| | |
|---|---|
| *H04N 23/67* | (2023.01) |
| *G01S 17/08* | (2006.01) |
| *G02B 7/36* | (2021.01) |
| *G03B 13/36* | (2021.01) |
| *G06K 7/14* | (2006.01) |

(52) U.S. Cl.
CPC ........... *H04N 23/671* (2023.01); *G01S 17/08* (2013.01); *G02B 7/36* (2013.01); *G03B 13/36* (2013.01);
(Continued)

(58) Field of Classification Search
CPC ....... H04N 5/232121; H04N 5/232127; H04N 5/2251; H04N 5/23212; G01S 17/08;
(Continued)

(56) References Cited

U.S. PATENT DOCUMENTS

| | | |
|---|---|---|
| 5,034,768 A | 7/1991 | Miyadera |
| 5,436,656 A | 7/1995 | Soga et al. |
| (Continued) | | |

FOREIGN PATENT DOCUMENTS

| | | |
|---|---|---|
| DE | 10213861 B4 | 11/2002 |
| DE | 102018102917 B3 | 1/2019 |
| (Continued) | | |

OTHER PUBLICATIONS

Office Action dated Oct. 30, 2020 issued in corresponding German Application No. 10 2020 109 928.2.

*Primary Examiner* — Gevell V Selby
(74) *Attorney, Agent, or Firm* — Nath, Goldberg & Meyer; Jerald L. Meyer

(57) ABSTRACT

A camera for detecting an object in a detection zone is provided that has an image sensor for recording image data, a reception optics having a focus adjustment unit for setting a focal position, a distance sensor for measuring a distance value from the object, and a control and evaluation unit connected to the distance sensor and the focus adjustment unit to set a focal position in dependence on the distance value, and to determine a distance value with the distance sensor via a variable measurement duration that is predefined in dependence on a provisional distance value such that a measurement error of the distance value and thus, on a recording of image data of the object, a focus deviation of the set focal position from an ideal focal position remains small enough for a required image sharpness of the image data.

19 Claims, 3 Drawing Sheets

Figure 1:
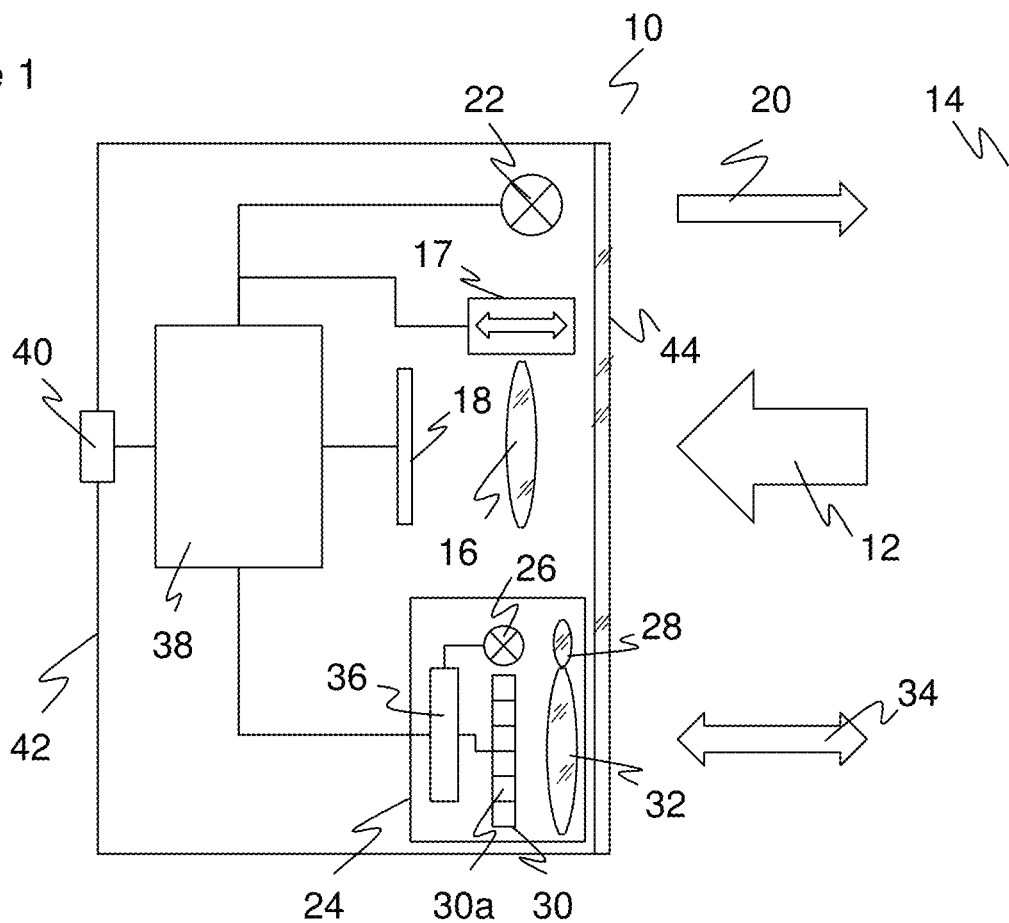

(52) U.S. Cl.
CPC ......... *G06K 7/1413* (2013.01); *G06K 7/1417* (2013.01); *H04N 23/675* (2023.01)

(58) Field of Classification Search
CPC .......... G01S 17/10; G01S 7/497; G01S 17/88; G02B 7/36; G02B 7/08; G02B 7/40; G03B 13/36; G03B 3/10; G03B 13/20; G06K 7/1413; G06K 7/1417; G01B 11/026; G01B 11/00
See application file for complete search history.

(56) References Cited

U.S. PATENT DOCUMENTS

| | | | |
|---|---|---|---|
| 6,317,563 | B1 | 11/2001 | Maeda |
| 2006/0109369 | A1* | 5/2006 | Yamazaki .......... H04N 5/23241 348/E5.045 |
| 2013/0113919 | A1 | 5/2013 | Qiao et al. |
| 2014/0055662 | A1* | 2/2014 | Torabi .............. H04N 5/232123 348/345 |
| 2018/0106607 | A1* | 4/2018 | Umemura ................ G06F 17/11 |
| 2019/0250364 | A1* | 8/2019 | Schneider .............. G02B 7/026 |
| 2020/0217957 | A1* | 7/2020 | Masuda ........... H04N 5/232939 |

FOREIGN PATENT DOCUMENTS

| | | |
|---|---|---|
| DE | 102018105301 A1 | 9/2019 |
| EP | 2051120 A1 | 4/2009 |
| JP | H07190756 A | 7/1995 |
| JP | H08146286 A | 6/1996 |
| JP | 2005010515 A | 1/2005 |
| JP | 2016033784 A | 3/2016 |
| WO | 2009061317 A1 | 5/2009 |
| WO | 2012014521 A1 | 2/2012 |

* cited by examiner

CAMERA AND METHOD FOR DETECTING IMAGE DATA

The invention relates to a camera and to a method of detecting image data of an object in a detection zone.

Cameras are used in a variety of ways in industrial applications to automatically detect object properties, for example for the inspection or for the measurement of objects. In this respect, images of the object are recorded and are evaluated in accordance with the task by image processing methods. A further use of cameras is the reading of codes. Objects with the codes located thereon are recorded using an image sensor and the code zones are identified in the images and then decoded. Camera-based code readers also cope without problem with different code types than one-dimensional barcodes which also have a two-dimensional structure like a matrix code and provide more information. The automatic detection of the text of printed addresses, (optical character recognition, OCR) or of handwriting is also a reading of codes in principle. Typical areas of use of code readers are supermarket cash registers, automatic parcel identification, sorting of mail shipments, baggage handling at airports, and other logistic applications.

A frequent detection situation is the installation of the camera above a conveyor belt. The camera records images during the relative movement of the object stream on the conveyor belt and instigates further processing steps in dependence on the object properties acquired. Such processing steps comprise, for example, the further processing adapted to the specific object at a machine which acts on the conveyed objects or a change to the object stream in that specific objects are expelled from the object stream within the framework of a quality control or the object stream is sorted into a plurality of partial object streams. If the camera is a camera-based code reader, the objects are identified with reference to the affixed codes for a correct sorting or for similar processing steps.

The camera is frequently a part of a complex sensor system. It is, for example, customary in reading tunnels on conveyor belts to install a plurality of camera-based code readers next to one another, on the one hand, to cover a larger conveyor belt width and, on the other hand, to install them from different perspectives to record objects from a plurality of sides. The geometry of the conveyed objects is furthermore frequently measured in advance using a separate laser scanner to determine focus information, release times, image zones with objects and the like from it.

Without advance information of a laser scanner on the object spacings, whether an image is recorded in a focused focal position can be determined using the contrast. To set the focus in this manner, a large number of images have to be recorded and a good starting point is not initially known. This is in particular problematic with a very small depth of field range because the contrasts outside the depth of field range are highly blurred and it is thus difficult to indicate the direction in which the focus adjustment should move.

Another option is to measure the distance from the object using the camera itself. In this respect, however, an error in the distance measurement can become larger than the depth of field range, with the result that the focal position set with reference to the distance measurement still does not result in the recording of focused images.

A distance sensor that is based on a time of flight (TOF) process is integrated in a camera in DE 10 2018 105 301 A1. A height profile is thus measured and different functions are implemented with reference thereto. One of these functions is the setting of the focal position of a reception optics. The accuracy of the distance measurement and of the setting of the focal position is not discussed here.

It is therefore the object of the invention to achieve an improved recording of images in a focused focal position.

This object is satisfied by a camera and by a method of detecting image data an object in a detection zone in accordance with the respective independent claim. An image sensor records images or image data of the detection zone and thus of an object located there. To produce focused images, a focally adjustable reception optics is provided, that is a reception objective, that has one or more lenses and other optical elements depending on the quality demands. A distance sensor measures a distance value for the distance between the camera and the object to be recorded. A control and evaluation unit acts as a focus adjustment unit. For this purpose, it receives the distance value from the distance sensor and sets the focal position of the reception optics to this distance value. The control and evaluation unit is preferably additionally connected to the image sensor to read, pre-process, evaluate, and the like image data. Alternatively, there are respective separate modules that take care of the focusing, on the one hand, and the other tasks in the camera such as the processing of the image data.

The invention starts from the basic idea of measuring the distance value using a variable measurement duration. For the distance sensor measures the distance value the more accurately, the longer the measurement duration is available for the distance measurement. On the other hand, the demand on the accuracy of the distance measurement depends on the distance the object is at since the depth of field range, and thus the distance interval, in which a focus deviation between the set focal position and the ideal focal position can be tolerated, has a distance dependence. To take them both into account, a tolerable focus deviation or a required precision of the setting of the foal position for a required image sharpness is determined using a provisional distance value, in particular a provisional measurement of the distance sensor with a still short measurement duration. The distance is then measured over a measurement duration at which the distance value becomes at least so accurate that the remaining measurement error is at most so large as this still acceptable focus deviation. Again in other words, the distance sensor measures over a measurement duration that ensures that the measurement error is small enough that the focal position thereupon set is within the depth of field range. The term depth of field range may not be interpreted too narrowly here, as explained below.

The invention has the advantage that a precise focusing is possible. Any unnecessary inertia of the focus adjustment is simultaneously avoided by the dynamic adaptation of the measurement duration to the accuracy actually required for the object specifically to be recorded, in contrast, for example, to if a constant long measurement duration had been selected for the distance sensor in advance and independently of the distance. The distance sensor can itself already deliver a good starting value after a short measurement duration. This starting value is already sufficient in certain distance ranges, in particular with a large depth of field range in the far zone, because the measurement errors are small enough. As soon as necessary, and only then, a longer measurement duration is used to exactly set a focal position even with little play for a focus deviation, in particular with a small depth of field range in the near zone, still corresponding to the demands.

The distance sensor is preferably integrated in the camera. The system thereby remains compact and encapsulated. The control and evaluation unit has simple internal access to the distance sensor.

The distance sensor is preferably configured as an optoelectronic distance sensor, in particular in accordance with the principle of the time of flight process. Such distance sensors are available as completed chips or modules. The distance sensor particularly preferably has a plurality of SPADs (single photon avalanche photodiodes) that each measure a single time of flight via TDCs (time-to-digital converters). The measurement error can then be reduced via the number of individual times of flight that enter into a distance value by means of a statistical evaluation. A longer measurement period permits a multiple transmission and reception of light pulses and thus the detection of more exact distance values.

The control and evaluation unit is preferably configured to read a code content of a code on the object using the image data. The camera thus becomes a camera-based code reader for barcodes and/or 2D codes according to various standards, optionally also for text recognition (optical character recognition, OCR). Before a code is read, a segmentation is even more preferably carried out by which regions of interest (ROIs) are identified as code candidates.

The control and evaluation unit is preferably configured to reparameterize the distance sensor for a respective distance measurement having a required measurement duration. The distance sensor is thus reconfigured for the respective measurement and subsequently delivers, with the now suitably selected measurement duration, a distance value for which it is ensured that the measurement errors are small enough.

The distance sensor is preferably configured to produce individual distance measurement values after a fixed individual measurement duration, wherein the control and evaluation unit is configured to set a required measurement duration as a multiple of the individual measurement duration by a plurality of individual measurements. In this embodiment, the distance sensor already delivers a measurement value after a preferably short individual measurement duration. Its precision is, however, at most sufficient for a part of the distance zone to be covered. Otherwise the measurement duration is extended by measurement repeats so that a more exact distance measurement value can then be calculated from k individual distance measurement values.

The control and evaluation unit is preferably configured to determine the distance value as a running average over a plurality of individual measurements. A running average has the advantage that a distance measurement value with corresponding statistics is already respectively available as required after a brief settling phase over the respective history after a single further individual measurement.

The control and evaluation unit is preferably configured to reset the running mean when an individual distance measurement value differs by at least one threshold value from the previous running mean. A running mean remains valid as long as the same distance is still being measured in the detection zone. If the object moves so that the distance from another object structure is now measured or if a different object actually enters into the detection zone, the running mean would still be falsified by the previous distance and it is then better to restart the averaging and to forget the history. This is assessed by a comparison of the result of a current individual measurement with the previous running mean since the current individual measurement should be within the expected distribution. If a threshold is exceeded in this comparison, the running mean is reset, i.e. a new running mean is determined starting from the current individual measurement. The threshold value can be made dependent on the current distance value, either the current individual measurement or the previous running mean, because larger measurement errors are also to be expected with a larger distance and larger fluctuations are therefore also permitted.

The provisional distance value is preferably an individual distance measurement value or a previous running average over some individual measurements. The required measurement duration to determine a distance having sufficiently small measurement errors depends on the object distance as explained in even more detail immediately from the next paragraph onward. This object distance is, however, initially unknown so that there seems to be a chicken-and-egg problem. This can, however, actually be resolved in that the measurement duration is determined in accordance with the provisional distance value. The provisional distance value admittedly still suffers from too great a measurement error, but is accurate enough to fix the measurement duration, with optionally, for reasons of safety, a slight overestimation being able to be planned. An individual measurement or a running average over only some individual measurements can be used as the basis for the provisional distance value. In principle, the measurement duration could be tracked with increasing accuracy of the running average after further measurement repeats if it is found that the originally used provisional distance value deviated by too much and at least one further measurement repeat could be appended, for example.

The control and evaluation unit is preferably configured to associate a still permitted focus deviation with a distance value while observing a required image sharpness, in particular with reference to an association rule or a table. It has previously above all been explained how a measurement duration can be set and reached in that the distance measurement has sufficiently small measurement errors. It is now a question of the counter piece, namely which demands are to be made on the measurement errors. For this purpose, the control and evaluation device is aware of an association between the distance and a focus deviation still permitted for this distance. The still tolerable focus deviation that results from the association with the provisional distance value explained in the previous paragraph limits the permitted measurement error and thus fixes the required measurement duration. The association rule can in particular be predefined as an analytical function or as an approximation, for example overall or piece by piece linear polynomial function, or as a lookup table (LUT).

The required image sharpness is preferably reached when the object is recorded in a depth of field range with the set focal position. This is ensured via the measurement duration and the largest measurement errors of the distance value thus achieved. The association of the distance value with the permitted focus deviation can here be expressed as an association between the provisional distance value and the associated extent of the depth of field range. The depth of field range is accordingly not defined purely physically in dependence on the embodiment, but can rather depend on which evaluation goal is pursued by the image data.

The control and evaluation unit is preferably configured to determine the depth of field range from optical properties. In this embodiment, the depth of field range is to be understood in the narrower optical or physical sense. This can in particular be determined according to the rule $DOF_P(d) \sim d^2 Nc/f^2$. $DOF_p$ is here the physical depth of field range (DOF=depth of field), d is the distance from the object, N is the numerical aperture of the objective that is thus dependent on the f-number, c is the circle of confusion and corresponds to the degree of permitted blur such as a pixel on the image sensor, and f is the focal length of the reception optics. Most of these parameters are objective constants of the selected reception optics and it can be recognized that due to the quadratic distance dependence of $DOF_p$ on d, the distance measurement should have particularly small measurement errors in the near zone.

The control and evaluation unit is preferably configured to determine the depth of field range from application-specific demands. This is the further understanding of a depth of field range addressed multiple times. It is here not primarily pure depth of field criteria that are important, but rather the question whether the image data will permit the desired evaluation. This may have to be evaluated very differently from application to application.

The control and evaluation unit is preferably configured to read a code content of a code on the object using the image data, with a focus deviation being small enough if the image sharpness therewith is sufficient to read a code. This can be understood as a preferred case of application-specific demands on the depth of field range; the image should namely be recorded so distinctly that a code can be read. This expectation of when the image sharpness is sufficient to read a code can be simulated in advance or can be generated by experiment. For this purpose, codes are presented to the camera under typical conditions, for example with reference to environmental light and print quality, at different distances to determine the focus deviation up to which a code is still read (GoodRead) or the focus deviation from which the code is no longer read (Noread).

The measurement duration to be set preferably depends on a code type, a module size, for example indicated in pixels per module, and/or on a decoding process. They are parameters or settings that have a considerable effect on the image sharpness. In the terminology of an application-specific depth of field range, this in particular depends on said parameters.

The control and evaluation unit is preferably configured already to vary the focal position during the measurement duration. The focus adjustment is therefore not delayed until a precise distance value is present after the set measurement duration. The focal position is rather already adjusted in parallel with the distance measurement, for instance using the provisional distance value or a previously determined running mean from a plurality of individual distance values. A large part of the adjustment distance can thus already be covered during the measurement duration. The remaining fine adjustment then has much less of an effect on the inertia of the focus adjustment.

The camera is preferably installed in a stationary manner at a conveying device that leads objects to be detected in a conveying direction through the detection zone. This is a very frequent industrial application of a camera. The focus adjustment practically has to be able to react constantly and under tight time constraints due to the constantly changing objects and the strict predetermination of the object changes by the conveying device.

The method in accordance with the invention can be further developed in a similar manner and shows similar advantages in so doing. Such advantageous features are described in an exemplary, but not exclusive manner in the subordinate claims dependent on the independent claims.

Figure 2:
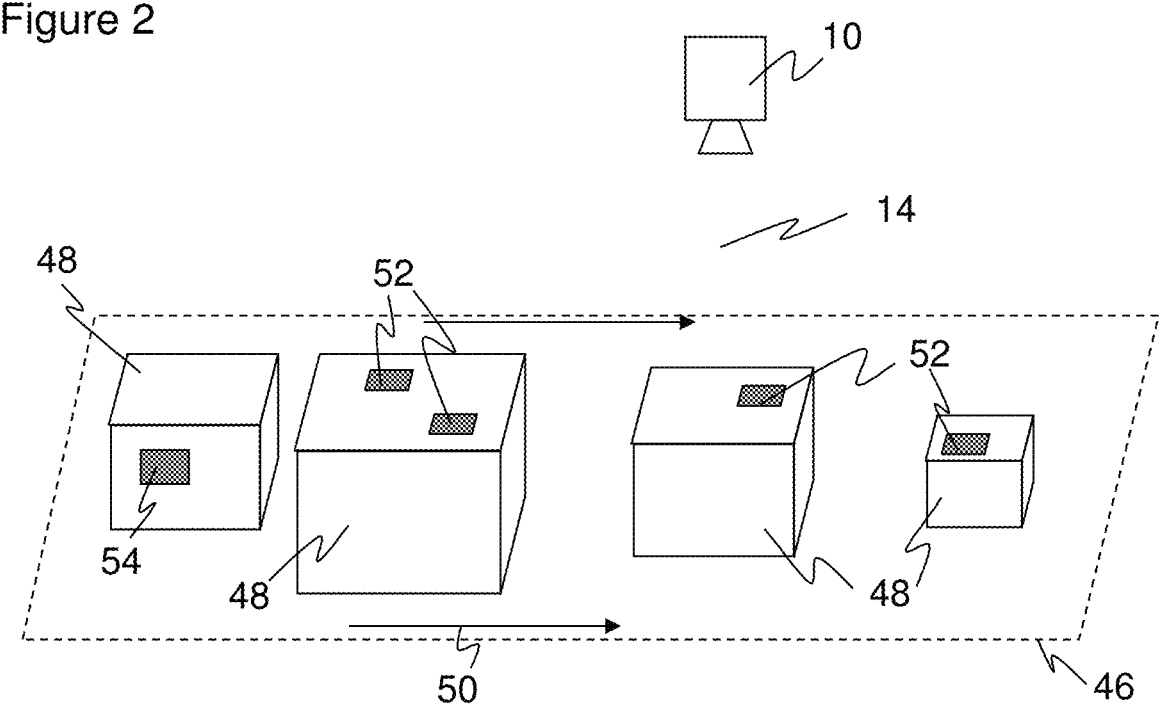
Figure 3:
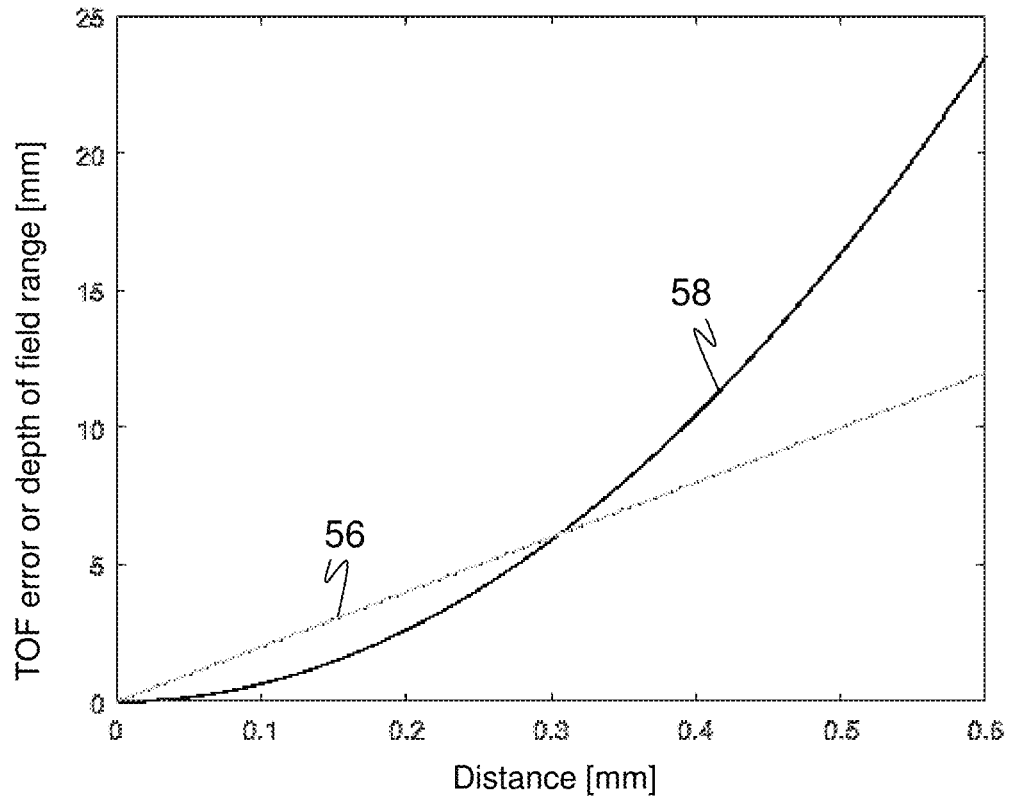
Figure 4:
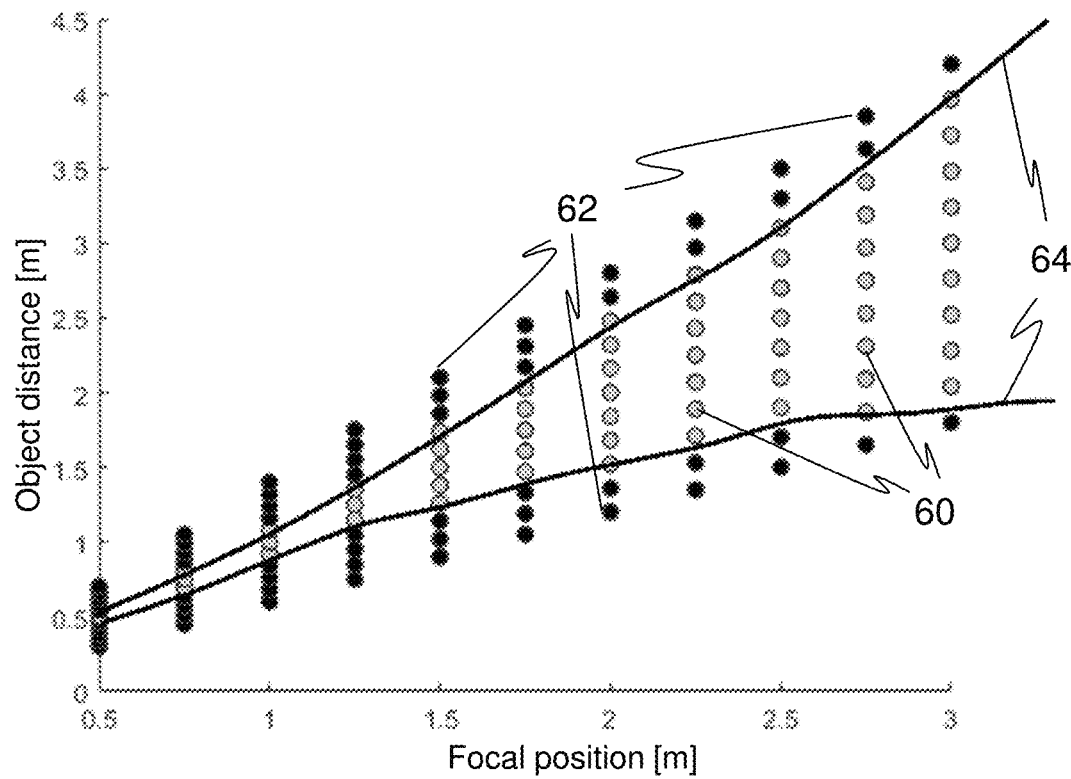
Figure 5:
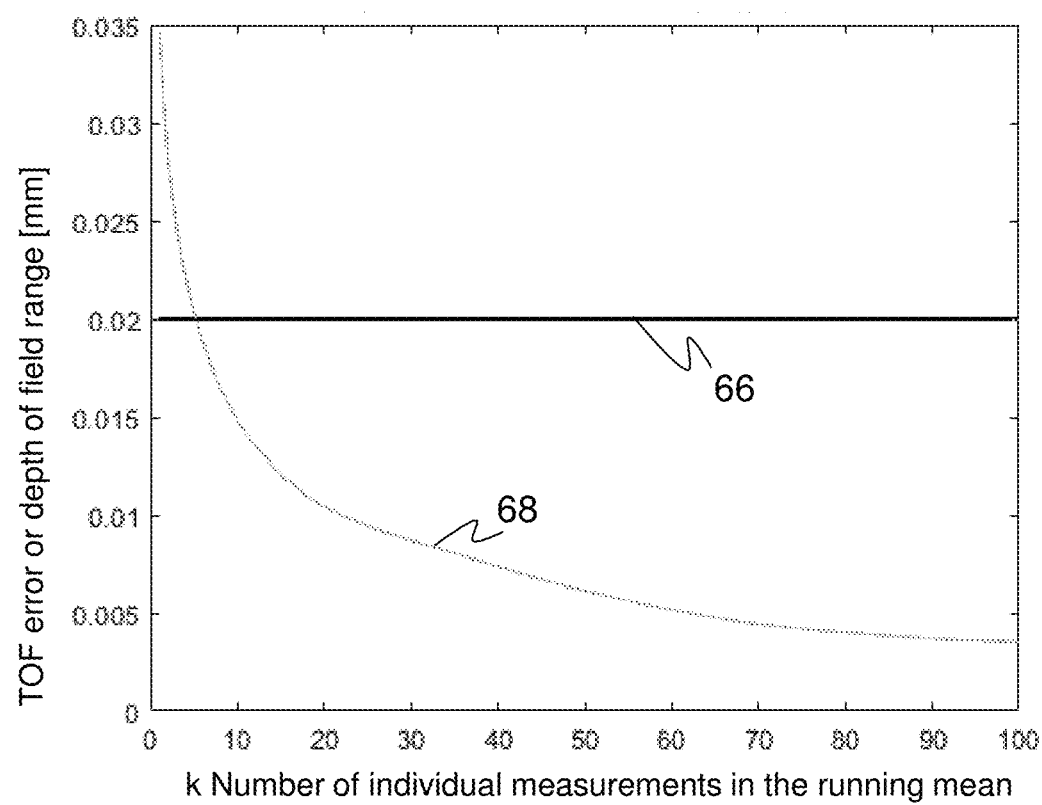

The invention will be explained in more detail in the following also with respect to further features and advantages by way of example with reference to embodiments and to the enclosed drawing. The Figures of the drawing show in:

FIG. 1 a schematic sectional representation of a camera with a distance sensor;

FIG. 2 a three-dimensional view of an exemplary use of the camera in an installation at a conveyor belt;

FIG. 3 a representation of the measurement error of a distance measurement or of the extent of a depth of field range in dependence on the object distance;

FIG. 4 a representation of successful and unsuccessful reading attempts of a code on an object at different focal positions (X axis) and object distances (Y axis); and FIG. 5 a representation of the measurement error of a distance measurement with respect to the number of individual measurements entering into a running average, with a predefined extent of a depth of field range being drawn for comparison.

FIG. 1 shows a schematic sectional representation of a camera 10. Received light 12 from a detection zone 14 is incident on a reception optics 16 that conducts the received light 12 to an image sensor 18. The optical elements of the reception optics 16 are preferably configured as an objective composed of a plurality of lenses and other optical elements such as diaphragms, prisms, and the like, but here only represented by a lens for reasons of simplicity. The reception optics 16 can be set to different focal positions by means of a focus adjustment 17 to record objects in focus at different distances. The most varied functional principles are conceivable for this purpose, for instance a change of the focal distance by a stepper motor or a moving coil actuator, but also a change of the focal length, for instance by a liquid lens or gel lens.

To illustrate the detection zone 14 with transmitted light 20 during a recording of the camera 10, the camera 10 comprises an optional illumination unit 22 that is shown in FIG. 1 in the form of a simple light source and without a transmission optics. In other embodiments, a plurality of light sources such as LEDs or laser diodes are arranged around the reception path, in ring form, for example, and can also be multi-color and controllable in groups or individually to adapt parameters of the illumination unit 22 such as its color, intensity, and direction.

In addition to the actual image sensor 18 for detecting image data, the camera 10 has an optoelectronic distance sensor 24 that measures distances from objects in the detection zone 14 using a time of flight (TOF) process. The distance sensor 24 comprises a TOF light transmitter 26 having a TOF transmission optics 28 and a TOF light receiver 30 having a TOF reception optics 32. A TOF light signal 34 is thus transmitted and received again. A time of flight measurement unit 36 determines the time of flight of the TOF light signal 34 and determines from this the distance from an object at which the TOF light signal 34 was reflected back.

The TOF light receiver 30 in the embodiment shown has a plurality of light reception elements 30a or pixels and can thus even detect a spatially resolved height profile. Alternatively, the TOF light receiver 30 only has one light reception element 30a or sets off a plurality of measurement values of the light reception elements 30a to one distance value. The design of the distance sensor 24 is purely exemplary and other optoelectronic distance measurements without time of flight processes and non-optical distance measurements are also conceivable. The optoelectronic distance measurement by means of time light processes is known and will therefore not be explained in detail. Two exemplary measurement processes are photomixing detection using a periodically modulated TOF light signal 34 and pulse time of flight measurement using a pulse modulated TOF light signal 34. There are also highly integrated solutions here in which the TOF light receiver 30 is accommodated on a common chip with the time of flight measurement unit 36 or at least parts thereof, for instance TDCs (time to digital converters) for time of flight measurements. In particular a TOF light receiver 30 is suitable for this purpose that is designed as a matrix of SPAD (single photon avalanche diode) light reception elements 30a. For such a SPAD-based distance measurement, a plurality of light reception elements 30a are particularly advantageous that are not used for a spatially resolved measurement, but rather for a statistical multiple measurement with which a more exact distance value is determined. The TOF optics 28, 32 are shown only symbolically as respective individual lenses representative of any desired optics such as a microlens field.

A control and evaluation unit 38 is connected to the focus adjustment 17, to the illumination unit 22, to the image sensor 18, and to the distance sensor 24 and is responsible for the control work, the evaluation work, and for other coordination work in the camera 10. It therefore controls the focus adjustment 17 with a focal position corresponding to the distance value of the distance sensor 24 and reads image data of the image sensor 18 to store them or to output them to an interface 40. The control and evaluation unit 38 is preferably able to localize and decode code zones in the image data so that the camera 10 becomes a camera-based code reader. A plurality of modules can be provided for the different control and evaluation work, for example to perform the focus adaptations in a separate module or to perform pre-processing of the image data on a separate FPGA.

The camera 10 is protected by a housing 42 that is terminated by a front screen 44 in the front region where the received light 12 is incident.

FIG. 2 shows a possible use of the camera 10 in an installation at a conveyor belt 46. The camera 10 is shown here only as a symbol and no longer with its structure already explained with reference to FIG. 1. The conveyor belt 46 conveys objects 48, as indicated by the arrow 50, through the detection zone 14 of the camera 10. The objects 48 can bear code zones 52 at their outer surfaces. It is the object of the camera 10 to detect properties of the objects 48 and, in a preferred use as a code reader, to recognize the code zones 52, to read and decode the codes affixed there, and to associate them with the respective associated object 48. In order also to detect object sides and in particular laterally applied code zones 54, additional cameras 10, not shown, are preferably used from different perspectives. In addition, a plurality of cameras 10 can be arranged next to one another to together cover a wider detection zone 14.

FIG. 3 shows by way of example by a gray line 56 the measurement error of a distance measurement of the distance sensor 24 and by a black line 58 the extent of a depth of field range in each case in dependence on the object distance. The absolute measurement accuracy of the distance sensor 24 here increases linearly with the distance. The depth of field range (DOF) is the distance zone in which the image of the camera 10 is deemed usable There can be different criteria for this that will be discussed below. The depth of field range is likewise dependent on the distance, but becomes larger with the distance in a non-linear manner.

As can be recognized in FIG. 3, there is a distance zone in which the depth of field range is smaller than the error of the distance measurement. Distances below approximately 30 cm are affected in this example. This means that a focal position adapted to this distance measurement cannot ensure any sufficiently focused image recording. For a distance measurement that approximately makes use of the error framework will lead to a focal position outside the depth of field range. The depth of field range of the camera 10 could be increased by measures such as a better objective than reception optics 16. This optimization potential is as a rule anyway already used as soon as the considerable effects on the manufacturing costs are acceptable and a distance zone would nevertheless remain in which this measure is not effective.

The approach of the invention is therefore to instead improve the accuracy of the distance measurement, and indeed in dependence on the distance and adapted to the depth of field range given for the respective distance. This is above all of interest for distance zones in which the depth of field range is within the order of magnitude of the error of the distance sensor 24.

Two questions have to be clarified for this approach. On the one hand, the distance sensor 24 has to measure respective distances having a maximum error. On the other hand, which maximum error actually has to be observed so that a focus setting is good enough, that is delivers images having a sufficient quality, has to be determined, with the latter naturally also implying criteria as to when the quality of an image is sufficient. Since this should all be defined in dependence on the object distance, an at least rough initial value for the distance measurement is required. It is not a question of the accuracy here. Any measurement value for the distance is sufficient.

The measurement accuracy of the distance sensor 24 can be varied by varying the measurement duration. Why a longer measurement duration results in more accurate results can be easily illustrated for a SPAD-based pulse process. Each SPAD contributes an event or a time stamp with such a so-called direct time of flight (dTOF) measurement and these events are evaluated together statistically, for example via a histogram. With a longer measurement duration, pulses can be repeatedly transmitted so that more events are registered and accordingly the better statistics also enable a better measured result. Very generally, independently of the technology of the distance sensor 24, averaging can take place over measurement repeats, with then the error falling with the root of the number of measurement repeats, and a longer measurement duration permits a corresponding increase of this number.

The distance sensor 24 can be respectively reparameterized to vary the measurement duration. This can, however, bring about transient effects and it cannot be simply ensured that the reparameterization itself does not generate any systematic errors. The measurement behavior of the distance sensor 24 is therefore preferably not affected at all, but an adaptive running average is rather formed. The distance sensor 24 carries out respective individual measurements, for example in a pulse process by transmitting and receiving a pulse or fewer pulses. The individual distance values of these individual measurements are subject to running averaging. The averaging window or the number k of respective averages is adapted to the distance. A large averaging window or k is therefore selected for a small depth of field range, in particular in the near zone, to reduce the statistical fluctuations. Conversely, with a large depth of field range, in particular in the far zone, a small averaging window or k is sufficient. The focus adjustment can thus always react with the lowest possible inertia since a larger averaging window or generally a larger measurement duration will only wait for the measurement result when this precision is actually required.

A provisional distance value was briefly addressed above with respect to which the required and achieved measurement error of the measurement is fixed. As now seen, the result of a first measurement with a short measurement duration or a running average with a small k or k=1 is in particular suitable for this.

A tool is available with the variable measurement duration to measure with the required maximum errors with the distance sensor 24 and the first of the two initially asked questions is answered. For the second question, which maximum error actually has to be observed to set a focal position for images of sufficient quality, a distinction should first be made between purely optical or physical demands and application-specific demands.

A physical depth of field range $DOF_p(d)$ can be approximated by the formula $DOF_p(d) \sim 2d^2Nc/f^2$. Here, d is the distance between the camera 10 and the object 48; N is the numerical aperture $f_{num}$ of the objective of the reception optics 16 and is thus f-number dependent; c is the circle of confusion and corresponds to the degree of permitted blue of, for example, one pixel on the image sensor 18; and f is the focal length of the objective. A number of these are accordingly parameters of the object that are known and fixed. Further influences on the depth of field range such as the f-number or the exposure can be largely precluded by fixing or by optimum setting.

However, specific demands of the application are not taken into account in the physical depth of field range $DOF_p(d)$. This becomes clear for the example of code reading. It is ultimately not a question of whether images satisfy physical contrast criteria, but rather whether the code can be read. In some cases, this application-specific depth of field range $DOF_{app}$ can be modeled by a factor κ that depends on application-specific parameters: $DOFapp(d) = \kappa DOF_p(d)$. Typical application-specific parameters are here the module size, for example measured in pixels per module, the code type, and last but not least the decoding algorithm used. If this cannot be modeled by a simple factor κ, the possibility at least remains of determining $DOF_{app}$ by simulation or experiment.

FIG. 4 shows a representation of reading attempts of a code 52 on an object 48 at different focal positions and object distances. Light dots 60 designate successful reading attempts (GoodReads) and dark dots 62 unsuccessful reading attempts (NoReads). The two lines 64 follow the border between them and the distance interval of the two lines designates the required application-specific depth of field range $DOF_{app}(d)$ in dependence on the object distance.

Such a diagram can be produced by measurement or simulation for specific conditions with respect to said parameters such as the code type, module size, decoding process, exposure. An association rule in the form of a function or table (lookup table, LUT) is thereby produced from which the control and evaluation unit 38 can read, with a given provisional distance value, a depth of field range and thus a required maximum error with which it is still ensured that a code will be readable. There can be a plurality of association rules for different conditions so that then a determination is made in a situation and application related manner, for example in dependence on the code type, module size, exposure, and the decoder used.

FIG. 5 again illustrates how a matching measurement duration for a required depth of field range can be found. The required depth of field range that is fixed in accordance with the method just described is shown by a black line 66, on the one hand. The measurement error of a distance measurement of the distance sensor 24 is furthermore shown by a gray line 68 in dependence on the measurement duration, with here the measurement duration on the X axis being determined specifically as an averaging depth k or as a number of individual measurements of a running mean. The more individual measurements k enter into the averaging, the longer therefore the measurement duration and the smaller the measurement error becomes. This behavior is seen as constant in simplified form in FIG. 5 and is calibrated in advance. An averaging depth of k>10 can be selected for the specific example, with here a little buffer still being considered with respect to the actual intersection of the two lines 66, 68 at approximately k=6.

A specific example will finally be looked at. An object 40 is arranged at a distance 0.1 m from the camera 10. Analog to FIG. 5, a required averaging depth k=10 of the running mean was determined. A fictitious measurement of distance values Dist could then appear as follows:

| | |
|---|---|
| Dist1: 0.095 m | Focal position is set to 0.095 m. This takes a time dT that may well be longer than an individual distance measurement. |
| Dist2: 0.113 m | Calculated mean value from two values. |
| Dist3: 0.101 m | Calculated mean value from three values. |
| Dist4: 0.098 m | Calculated mean value from four values. The focal position is now set to the first distance Dist1 = 0.095 m. Adjust the focal position further to the new mean value (refocusing). This is done a lot faster as a rule because the adjustment distance is shorter. |
| Dist5: 0.108 m | Mean value from five values, refocusing. |
| ... | |
| Dist10: 0.089 m | Mean value from ten values, refocusing. Required k = 10 reached for the first time. |
| Dist11: 0.106 m | Mean value from the last 10 values. Refocusing. |
| Dist12: 0.101 m | Mean value from the last 10 values. Refocusing. |
| ... | |
| Dist46: 0.099 m | Mean value from the last 10 values. Refocusing |
| Dist47: 0.531 m | JUMP larger than a defined threshold value. A new k is also set for the new distance. In this case, the distance is so large that the depth of field range is already larger for an individual measurement than the measurement error of the distance measurement (cf. FIG. 3). An averaging window where k = 1 is therefore sufficient; only an individual measurement is still required. The focal position is set to 0.531 m. This takes a time dT that is easily longer [ . . . etc. . . . ] |

The measurement series has largely already been explained. The focal position best known at the respective time is preferably immediately traveled to. This is initially only a rough setting that can require some adjustment time; the further steps track the focal position in accordance with the ever better distance measurement, with these small adjustment distances being covered fast. The focal position is exact enough for an image recording within the required depth of field range from the measurement of k=10 individual distance values onward.

A special aspect results if a new object 48 enters into the detection zone 14 or if the distance is measured after one edge to now a different object structure. This done at the last indicated measurement Dist47 in the exemplary measurement series. This jump is recognized in that the new value Dist47 differs greatly from the previous running mean. In somewhat more formal terms, the absolute difference of the current individual distance value, here Dist47=0.531 m, and of the previous running mean, here very precisely at 0.1 m, can be compared with a threshold value for this purpose. The threshold value is oriented on the expectable statistical fluctuation, for instance as a plurality of a standard deviation, and can be fixed in dependence on the distance or fixedly as a compromise over all the distances. The running mean is continued as long as said absolute difference is below the threshold value. This is the case up to the measurement value Dist46. A new averaging is started on a threshold exceeding since otherwise a mixed value would arise that is not significant and a new k is preferably also selected here.

It is conceivable to record images additionally during the focusing and to calculate values such as the contrast from the image.

The invention claimed is:

1. A camera for detecting an object in a detection zone, the camera comprising:
    an image sensor for recording image data;
    reception optics having a focus adjustment unit for setting a focal position;
    a distance sensor for measuring a distance value from the object; and
    a control and evaluation unit connected to the distance sensor (24) and the focus adjustment unit to set a focal position in dependence on the distance value,
    wherein the control and evaluation unit is configured to determine the distance value with the distance sensor via a variable measurement time duration that is predefined in dependence on a provisional distance value such that a measurement error of the distance value is at most equal to a predefined focus deviation of the set focal position from an ideal focal position, the measurement error remaining small enough for a required image sharpness of the image data.

2. The camera in accordance with claim 1,
    wherein the distance sensor is integrated in the camera.

3. The camera in accordance with claim 1,
    wherein the distance sensor is configured as an optoelectronic distance sensor.

4. The camera in accordance with claim 3, wherein the optoelectronic distance sensor is in accordance with the principle of the time of flight process.

5. The camera in accordance with claim 1,
    wherein the control and evaluation unit is configured to read a code content of a code on the object using the image data.

6. The camera in accordance with claim 1,
    wherein the control and evaluation unit is configured to reparameterize the distance sensor for a respective distance measurement having a required measurement time duration.

7. The camera system in accordance with claim 1,
    wherein the distance sensor is configured to produce individual distance measurement values after a fixed individual measurement time it, and
    wherein the control and evaluation unit is configured to set a required measurement time duration as a multiple of the individual measurement time duration by a plurality of individual measurements.

8. The camera in accordance with claim 7,
    wherein the control and evaluation unit is configured to determine the distance value as a running average over a plurality of individual measurements.

9. The camera in accordance with claim 8,
    wherein the control and evaluation unit is configured to reset the running average when an individual distance measurement value differs by at least one threshold value from the previous running average.

10. The camera system in accordance with claim 7,
    wherein the provisional distance value is an individual distance measurement value or a previous running average over some individual measurements.

11. The camera in accordance with claim 1,
    wherein the control and evaluation unit is configured to associate a still permitted focus deviation with the distance value while observing a required image sharpness.

12. The camera in accordance with claim 11,
    wherein the control and evaluation unit is configured to associate a still permitted focus deviation with the distance value while observing a required image sharpness with reference to an association rule or a table.

13. The camera in accordance with claim 1,
    wherein the required image sharpness is achieved when the object is still recorded with the set focal position in a depth of field range.

14. The camera in accordance with claim 13, wherein the depth of field range is a depth of field range determined from optical properties and/or from application-specific demands.

15. The camera in accordance with claim 1,
    wherein the control and evaluation unit is configured to read a code content of a code on the object using the image data; and wherein a focus deviation is small enough if the image sharpness therewith is sufficient to read a code.

16. The camera in accordance with claim 1,
    wherein the measurement time duration to be set depends on at least one of a code type, a module size, and a decoding process.

17. The camera in accordance with claim 1,
    wherein the control and evaluation unit is configured already to vary the focal position during the measurement time duration.

18. The camera in accordance with claim 1,
    that is installed in a stationary manner at a conveying device that guides objects to be detected in a direction of conveying through the detection zone.

19. A method of detecting image data of an object in a detection zone, comprising the steps of:
    measuring a distance value from the object with a distance sensor; and
    setting a focal position of reception optics in dependence on the distance value,
    wherein the distance value is determined over a variable measurement time duration that is predefined in dependence on a provisional distance value such that a measurement error of the distance value is at most equal to a predefined focus deviation of the set focal position from an ideal focal position, the measurement error remaining small enough for a required image sharpness of the image data.

* * * * *